US011194030B2

(12) United States Patent
Destefano et al.

(10) Patent No.: US 11,194,030 B2
(45) Date of Patent: Dec. 7, 2021

(54) VECTOR SENSOR ARRAY SURFACE WAVE RADAR

(71) Applicant: The MITRE Corporation, McLean, VA (US)

(72) Inventors: Nicholas E. Destefano, Chelmsford, MA (US); Janet L. Werth, Bedford, MA (US); Cecelia R. Franzini, Worcester, MA (US); Kevin M. Cuomo, Carlisle, MA (US)

(73) Assignee: The MITRE Corporation

( * ) Notice: Subject to any disclaimer, the term of this patent is extended or adjusted under 35 U.S.C. 154(b) by 203 days.

(21) Appl. No.: 16/585,343

(22) Filed: Sep. 27, 2019

(65) Prior Publication Data
US 2021/0096231 A1    Apr. 1, 2021

(51) Int. Cl.
*G01S 13/02*    (2006.01)
*G01S 7/03*    (2006.01)
(Continued)

(52) U.S. Cl.
CPC ........... *G01S 13/0218* (2013.01); *G01S 7/03* (2013.01); *G01S 7/292* (2013.01); *G01S 2013/0227* (2013.01); *H01Q 21/06* (2013.01)

(58) Field of Classification Search
CPC ......... G01S 13/0218; G01S 2013/0227; G01S 7/03; G01S 7/292; H01Q 21/06
See application file for complete search history.

(56) References Cited

U.S. PATENT DOCUMENTS

| 7,535,409 | B1 * | 5/2009 | Choe | ....................... | G01S 7/282 |
| | | | | | 342/159 |
| 2003/0142011 | A1 * | 7/2003 | Abramovich | .......... | H01Q 21/24 |
| | | | | | 342/159 |

(Continued)

FOREIGN PATENT DOCUMENTS

| CN | 105676168 | 6/2016 |
| CN | 106682615 | 5/2017 |

(Continued)

OTHER PUBLICATIONS

Pan et al. (Aug. 2017). "MIMO High Frequency Surface Wave Radar Using Sparse Frequency FMCW Signals," International Journal of Antennas and Propagation 2017: 1-16.

(Continued)

*Primary Examiner* — Timothy A Brainard
(74) *Attorney, Agent, or Firm* — Morrison & Foerster LLP

(57) ABSTRACT

System and methods for implementing a vector sensor array surface wave radar is provided. In one or more examples, the system can include a vector sensor array antenna that includes electromagnetic elements collectively configured to receive surface wave reflections generated by radar transmit antenna waves reflecting back from targets of interest. Once received by the vector sensor array, in one or more examples, the system can further include components that can process the incoming signal and use the incoming single to determine the location of one or more targets. In one or more examples, the vector surface array antenna can include three separate loop antennas that are arranged orthogonally to one another, and three dipole antennas that are arranged orthogonally to one another. In one or more examples, the vector surface array antenna can be configured to receive signals in the high frequency (HF) band.

30 Claims, 8 Drawing Sheets

(51) Int. Cl.
*G01S 7/292* (2006.01)
*H01Q 21/06* (2006.01)

(56) References Cited

U.S. PATENT DOCUMENTS

2003/0156056 A1* 8/2003 Perry ............... G01S 13/0218
342/82
2017/0363705 A1 12/2017 Parent et al.

FOREIGN PATENT DOCUMENTS

| | | |
|---|---|---|
| CN | 107064901 | 8/2017 |
| CN | 208614792 | 3/2019 |
| WO | 2018/178913 | 10/2018 |
| WO | 2019/035877 | 2/2019 |

OTHER PUBLICATIONS

Ponsford et al. (May 2010). "A Review of High Frequency Surface Wave Radar for Detection and Tracking of Ships," Turkish Journal of Electrical Engineering and Computer Sciences 18(3): 409-428.
Ponsford et al. (Jul. 2017). "Towards a Cognitive Radar: Canada's Third-Generation High Frequency Surface Wave Radar (HFSWR) for Surveillance of the 200 Nautical Mile Exclusive Economic Zone," Sensors 17(1588): 13 pages.

* cited by examiner

VECTOR SENSOR ARRAY SURFACE WAVE RADAR

FIELD OF THE DISCLOSURE

This disclosure relates to systems and methods for implementing a vector sensor array surface wave radar. These systems and methods can be used to detect the location of maritime targets that may not be detectable using conventional radar systems.

BACKGROUND OF THE DISCLOSURE

Radar is a detection tool that is often used to determine the range and location of distant objects. As an example, radar has long been employed as an effective tool for identifying and tracking aircraft during flight. Radar data can be used by commercial and military enterprises to "track" various aircraft transiting a given airspace, and can also be used to track terrestrial and maritime targets.

Radar systems can include a transmitter that transmits electromagnetic waves through an antenna. As the waves propagate in space, they may eventually collide with an object and be reflected back towards the antenna. The antenna can then be equipped to receive the reflection, and the received reflection can be processed by the radar system to determine various properties of the object that caused the initially transmitted wave to be reflected back.

In addition to tracking objects in the air or space, radar can also be used to track terrestrial objects. However, using radar to track sea-based or maritime objects can present a challenge. Radar systems are configured to detect objects within their line of sight. In other words, there must be a path that begins at the transmitter and ends at the object being detected for the electromagnetic energy to travel across in order to be able to see the object using the radar system. However, line of sight requirements for radar can prove to be problematic when trying to employ a radar system to detect maritime targets.

In the maritime context, the use of radar to detect targets such as boats can present issues with respect to the curvature of the earth. If a radar wave is transmitted from the shore, it will propagate across the surface of the ocean. However, as the distance from the transmitter becomes greater, the surface of the ocean will curve, while the radar wave may continue on straight trajectory. Thus, if a boat is situated far enough away from the radar, the radar may be unable to detect the boat because the curvature of the earth may place the boat out of the line of sight of the radar system.

Over-the-Horizon (OTH) radars can be employed in contexts where the curvature of the earth may limit a conventional radar system's ability to detect far off targets. OTH radars can include radar systems that are specially configured to detect targets at very long ranges beyond the horizon of the radar. One example of an OTH radar is a "surface wave" radar. Surface wave radars generate electromagnetic waves that, due to their frequency of transmission, allow favorable conditions for propagation along the surface of a medium such as water. In this way, even though the earth may curve at longer distances, the wave will still propagate along the surface of the water, and thus can make contact with targets that are not in the line of sight of the radar. While surface radars are able to illuminate targets at a further distance, detecting and processing reflected signals from surface radars can present a challenge due to noise and other radio wave interference.

In order to improve the signal quality, an OTH radar designer may choose to implement a radar system with a large footprint that has the capability of transmitting powerful signals so that when the reflection is received from a target there is ample power left in the reflection to facilitate accurate detection. However, implementing large radar stations to implement an OTH radar system may not be feasible due to the geographic constraints of the radar station as well as the cost in both land usage and hardware.

Thus an OTH radar system that is compact while simultaneously having the signal processing capabilities to process low power and low SNR signals to determine the range of maritime targets is desirable in order to provide such capability without the hardware and geographic costs associated conventional OTH radar systems.

SUMMARY OF THE DISCLOSURE

Accordingly, systems and methods for implementing an OTH radar using a compact design and enhanced signal processing capabilities are provided. In one or more examples of the disclosure, the OTH radar can transmit signals in the high frequency (HF) range. The antenna used to transmit and receive the HF signals can be configured as a vector sensor array with a plurality of dipoles and loop antennas so as to receive signals from all components of the electromagnetic field.

The OTH radar system can also include front-end signal processing electronics that are configured to amplify the signal and maximize a signal-to-noise ratio of the signal so that it can be later processed to extract location information regarding one or more targets. Finally, in one or more examples of the disclosure, the OTH radar system can receive data on each of the six antennas of the vectors surface array. To determine the location of a target, the data received at each of the six antennas can be processed using an algorithm in which the Poynting vector of the antenna is solved for using an assumption that is made regarding the angle of the beam. The angles that yield the maximum values of the Poynting vector can be determined and then used to determine the location of a target.

DETAILED DESCRIPTION

Figure 1:
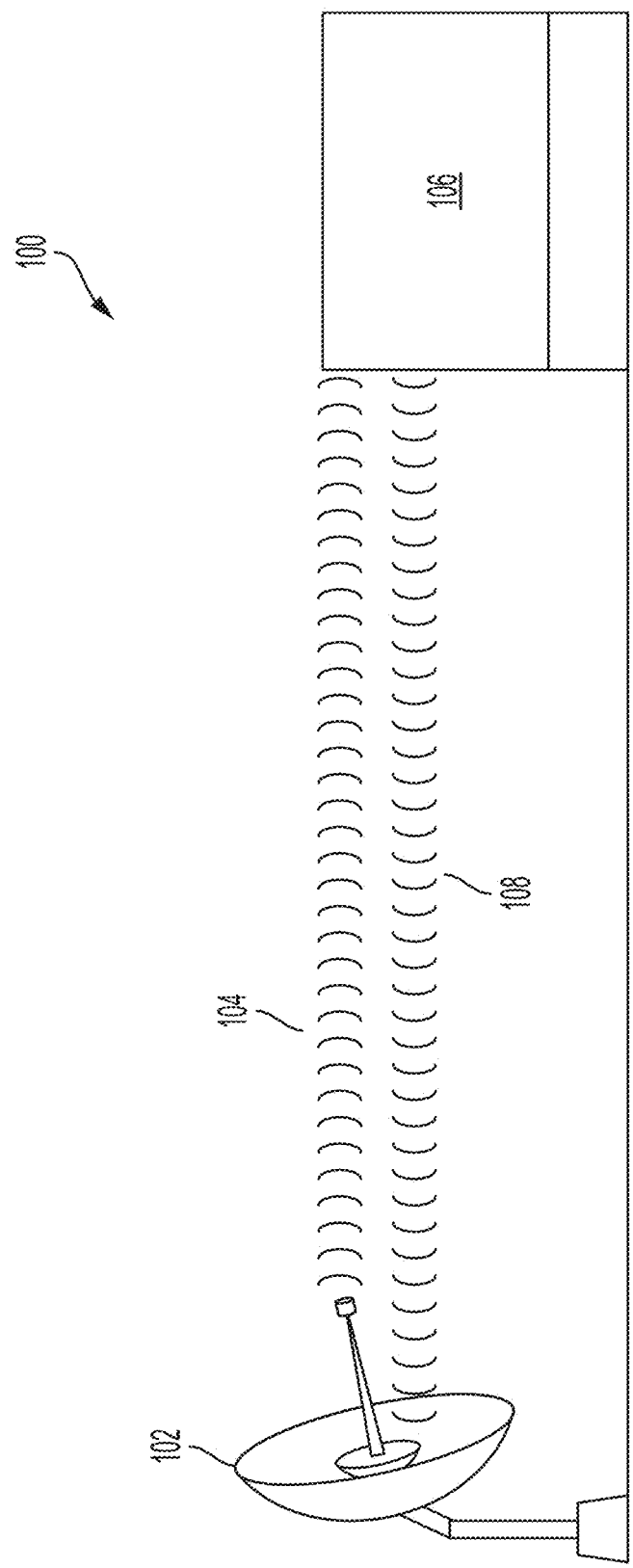
FIG. 1 illustrates an exemplary radar system according to examples of the disclosure.

In the following description of the disclosure and embodiments, reference is made to the accompanying drawings in which are shown, by way of illustration, specific embodiments that can be practiced. It is to be understood that other embodiments and examples can be practiced and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present invention include process steps and instructions described herein in the form of an algorithm. It should be noted that the process steps and instructions of the present invention could be embodied in software, firmware, or hardware, and, when embodied in software, could be downloaded to reside on and be operated from different platforms used by a variety of operating systems.

The present invention also relates to a device for performing the operations herein. This device may be specially constructed for the required purposes, or it may comprise a general-purpose computer selectively activated or reconfigured by a computer program stored in the computer. Such a computer program may be stored in a non-transitory, computer-readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application-specific integrated circuits (ASICs), or any type of media suitable for storing electronic instructions and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

Described herein are systems and methods for implementing a vector sensor array that is configured to detect HF surface wave reflections from maritime targets and process the reflections to determine the range and approximate location of the target.

FIG. 1 illustrates an exemplary radar system according to examples of the disclosure. In the example of FIG. 1, the system 100 can include an antenna 102 that is configured to transmit and receive electromagnetic waves at a particular frequency or frequency range. In one or more examples, the transmit and receive capabilities of the antenna 102 can be implemented in two separate antennas such that a first antenna is used to transmit electromagnetic waves and a second antenna is used to receive any reflections of electromagnetic energy.

In the example of FIG. 1 which shows a single antenna 102, the antenna 102 can transmit one or more electromagnetic waves 104 that are propagated over free space as shown in the figure. In one or more examples, as the electromagnetic waves 104 propagate in space they may strike a target 106. Target 106, in one or more examples can represent an object in free space such as a vehicle or airplane that the user of the system 100 may wish to identify and discover details about its location in free space.

When the electromagnetic waves 104 transmitted by antenna 102 strikes target 106, the collision may generate one or more reflections 108. Reflections 108 can also take the form of electromagnetic energy, and the reflections 108 can emanate from target 106 in free space until they arrive at the antenna 102. A receiver (not pictured) can receive the reflections 108 from the target 106 and analyze the waves to determine both the angle, range, and velocity of the target 106.

Radars such as the one depicted in FIG. 1 can image targets that are within its line of sight. In other words, there must be a line of sight between the antennas such that the electromagnetic waves 104 emanating from the antenna 102 have a straight line path from the antenna to the target. If such a line of sight does not exist, the electromagnetic waves 104 may not ever strike the target 106 and thus the system 100 may not be able to obtain any data regarding the targets location, range, and speed. The above requirement, i.e., that the radar have a line of sight, with respect to the target, can hinder the ability of the radar to detect certain targets, as discussed in further detail below.

Figure 2:
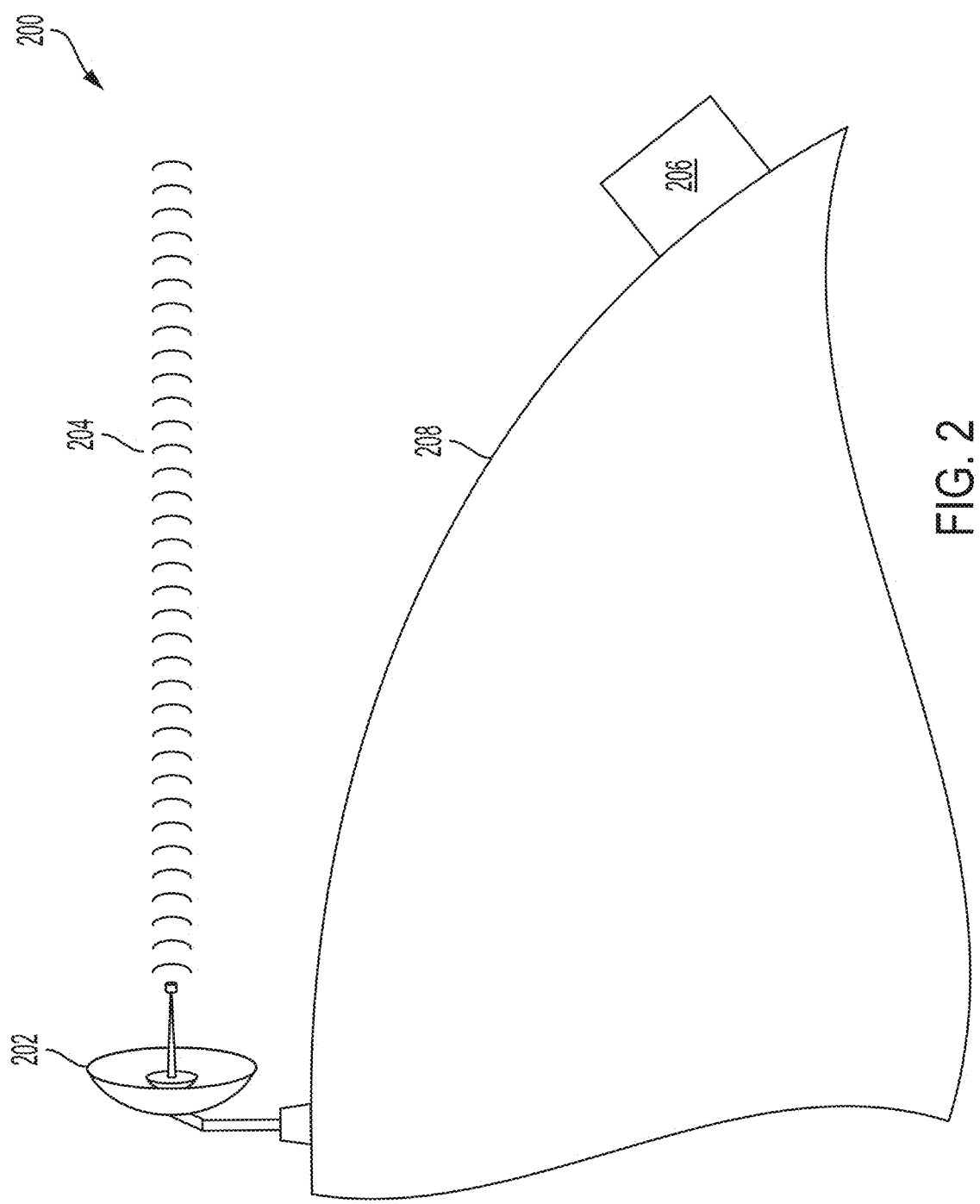
FIG. 2 illustrates another exemplary radar system according to examples of the disclosure.

FIG. 2 illustrates another exemplary radar system according to examples of the disclosure. In the example of FIG. 2, the radar system 200 can be positioned so as to acquire range, location, and velocity information regarding maritime targets. For example, the radar system 200 can be positioned so as to target boats in the ocean that may be positioned at long ranges away from the system 200. Just as in the example of FIG. 1, the radar system 200 can include an antenna 202 that is configured to emit electromagnetic energy 204 so as to range potential targets. However, in the example of FIG. 2, the target 206 may not be within the line of sight of the radar. In the maritime context, this may occur due to the curvature of the earth as depicted at 208. Since the earth is curved, over long distances the ocean may curve as well.

In one or more examples, the electromagnetic waves 204 emanating from antenna 202 can travel in a straight line path. For distances closer to the antenna 202, the waves 204 can travel along the surface of the earth's curvature 208. However, over longer distances, while the electromagnetic waves 204 may travel in a straight line path, the earth will begin to curve away from the straight line path. If a target, such as target 206 is positioned far enough away from the antenna, the earth's curvature may take the target 206 out of the straight line path of the electromagnetic wave 204. This can mean that the electromagnetic energy 204 may never impinge or strike the target 206, thus making it undetectable to the radar system 200.

Thus in the maritime context, radars may only be able to range targets that are closer to the transmit antenna 202 (i.e., within its line of sight). Because of the earth's curvature, and the straight line propagation of electromagnetic energy, the radar system 200 may not be able to detect targets that are further out than the line of sight of the radar.

One way to counteract this phenomenon is to position the antenna at a higher location and point it at a downward angle, so as to ensure that the antenna can have line of sight with respect to targets further afield. However, positioning the antenna at a higher elevation can require a location such as a hill or cliff, or can even require that the radar be mounted to a flying object such as an airplane. Such an accommodation may not be possible, or may make implementing a maritime system unfeasible.

While electromagnetic energy at most frequencies in the spectrum exhibit the straight line propagation properties described above, some electromagnetic energy may include specific properties that don't conform to the straight line propagation model. As an example, electromagnetic waves in the HF spectrum, instead of propagating in a straight line, may instead allow favorable conditions for propagation as surface waves.

Electromagnetic waves in the HF spectrum (3-30 MHz) has been known to propagate over long distances and can illuminate maritime targets over long distances due to their ability to couple well to the conducting ocean surface. In other words, HF waves have the unique property in that rather than traveling in a straight line in a maritime scenario, they are able to propagate along the surface of the water in the ocean, and can also follow the earth's curvature, thus being able to illuminate targets that may not be in the line of sight of the antenna. This property of HF waves can allow for a radar system that transmits and receives HF waves to view targets that may be out of the line of sight of the radar due to the earth's curvature. However, as discussed in detail below, the use of HF waves in a radar system can pose its own unique set of challenges that must be overcome in order to make HF radar systems an effective tool for the detection of maritime targets.

Figure 3:
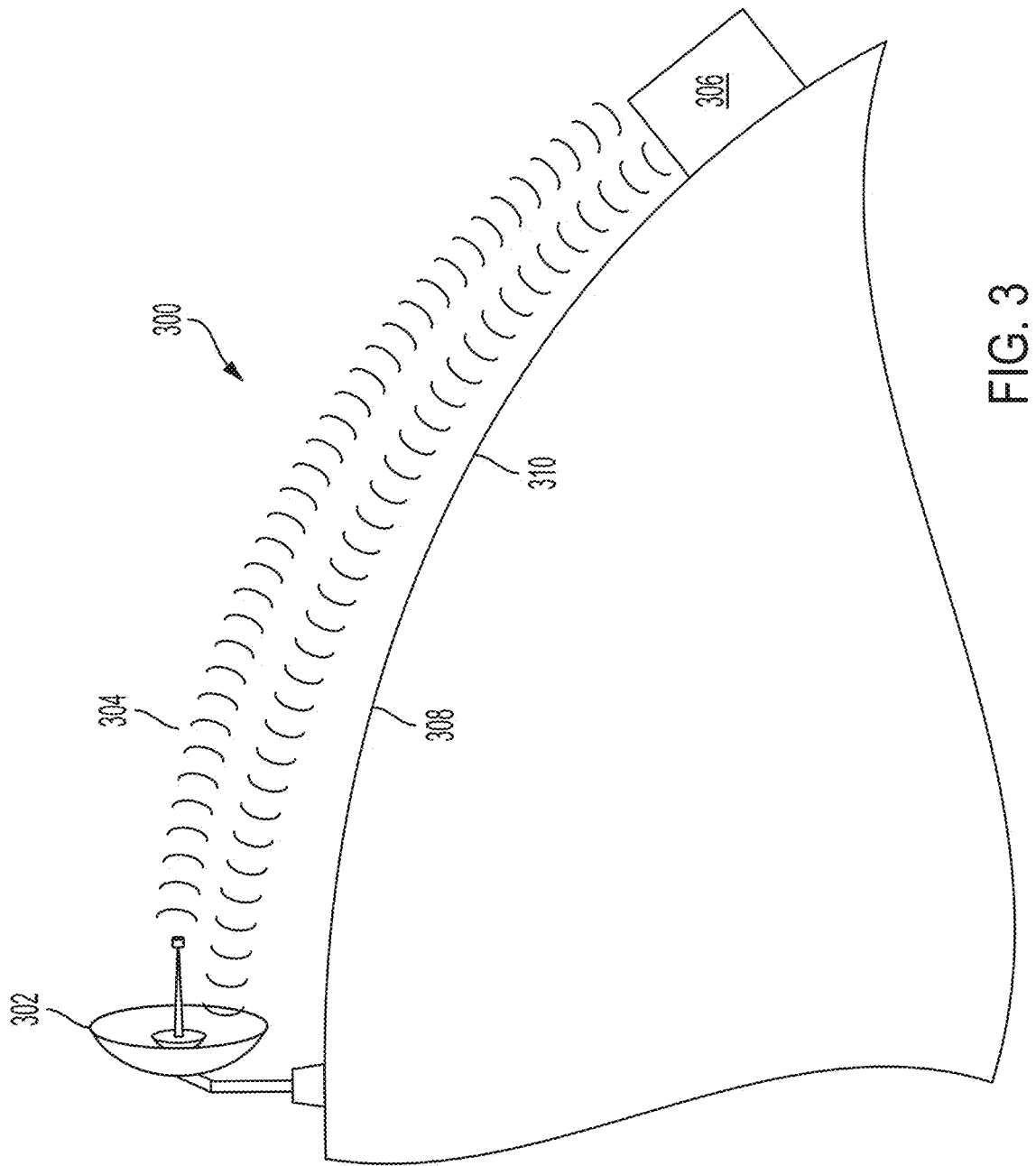
FIG. 3 illustrates an exemplary over-the-horizon radar system according to examples of the disclosure.

FIG. 3 illustrates an exemplary over-the-horizon radar system according to examples of the disclosure. In the example of FIG. 3, the radar system 300 can transmit electromagnetic waves in the HF spectrum so that rather than propagating in a straight line, the waves can follow the path of the ocean surface and thus follow the curvature of the earth's surface.

Just like the examples of FIG. 1 and FIG. 2, the radar system 300 can include an antenna 302 that transmits electromagnetic waves to illuminate potential targets. However, in the example of FIG. 3, the antenna 302 can be configured to transmit electromagnetic waves in the HF frequency spectrum (the structure of the antenna will be discussed in further detail below.) By using the HF spectrum, the waves 304 can propagate along the curvature 310 of the earth's surface (i.e., propagating along the surface of the water). In this way, the waves 304 can illuminate target 306 even though target 306 may not be within the line of sight of the antenna.

Once the waves 304 illuminate target 306, they can be reflected back toward the antenna. Since the transmitted waves 304 were in the HF spectrum, the reflected waves 308 can also be in the HF spectrum and thus can also follow the curvature 310 of the earth's surface eventually arriving back at antenna 302. In this way, antenna 302 can receive the reflected waves 308 that are reflected from target 306 and thus can generate range, position, and velocity information about target 306.

Due to the electromagnetic environment present in maritime environments, HF radar system may have to utilize a transmitter with a large amount of power so as to get an SNR that is large enough so as to discern reflected waves from other electromagnetic sources. Furthermore, since the HF radar system may be used to scan for targets that are at great distances, often times, the beam of electromagnetic energy emanating from the antenna may be narrow (in terms of beam width), to ensure accuracy in pinpointing the location of an illuminated target.

In order to have a narrow beam so as to ensure accuracy in pinpointing targets, conventional HF systems can deploy large antennas that can occupy a significant amount of space. Using a large antenna can allow for a HF system to transmit a narrow beam that can be scanned across an environment to look for targets of interest and determine their location with sufficient accuracy. However, in order to implement a HF surface wave system with a large antenna, a user of the system must secure a large tract of land on which to set up the large transmit and receive antennas necessary to implement the system.

It would be beneficial to use a smaller more compact antenna to implement a HF surface wave radar; however the performance of such an antenna may not be adequate to accurately determine the position, range, and velocity of a target. For instance, a smaller antenna may have a larger beam width than a large antenna. The wider beam can make it more difficult to differentiate targets that may be co-located in azimuth. Thus, in order to implement a HF surface wave antenna that uses a compact or smaller antenna, a method for accurately estimating the position of a target based on the received signals is needed to overcome the limitations associated with a wide beam width may be required.

Figure 4:
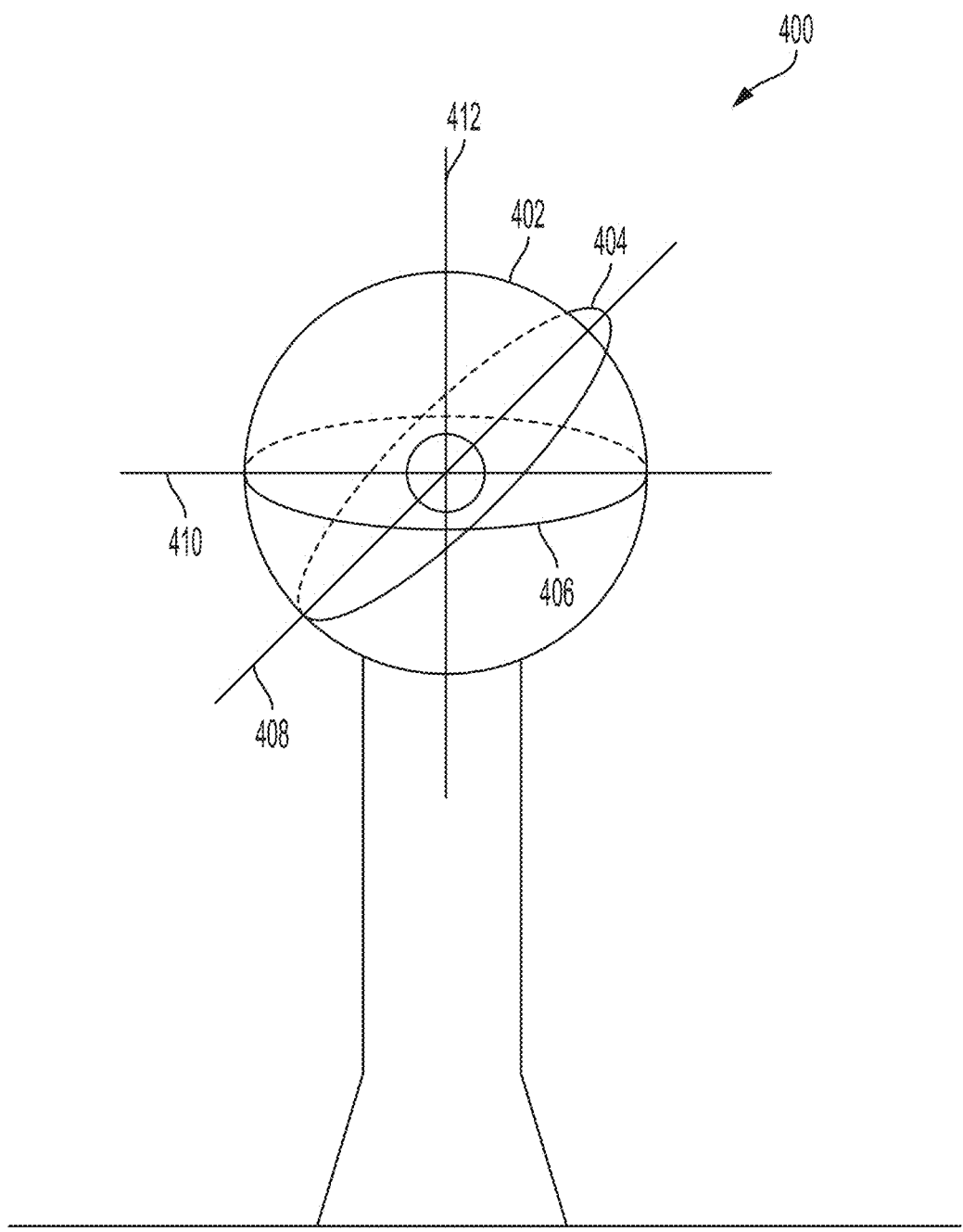
FIG. 4 illustrates an exemplary HF vector surface array antenna according to examples of the disclosure.

FIG. 4 illustrates an exemplary HF vector surface array antenna according to examples of the disclosure. The antenna 400 can occupy a smaller footprint and be of a smaller size than conventional HF surface wave antennas. In one or more examples, the antenna 400 can be approximately eight feet high and can be approximately six feet wide and six feet in length. In contrast, conventional HF surface wave receive antennas can be, in one or more examples, ten meters tall. In order to facilitate accurate estimation of the position of a target, the antenna 400 can have a plurality of conductive elements that can be collectively arranged to facilitate accurate estimation of a target illuminated by a surface wave radar.

In one or more examples of the disclosure, the antenna 400 can be implemented as a vector sensor array. A vector sensor array antenna can include a plurality of conducting elements that collectively receive signals in a particular beam pattern and width. The plurality of elements can be used for beamforming and can also increase the gain of antenna in certain directions while decreasing the gain of the antenna in other direction (i.e., beamforming). In the example of FIG. 4, the antenna 400 can include six separate conductive elements 402, 404, 406, 408, 410, and 412.

Elements 402, 404, and 406 can be implanted as loop antennas that can be arranged orthogonally with respect to one another. Elements 408, 410, and 412 can be implemented as dipole antennas that are also arranged orthogonally to one another. In this way, antenna 402 can include six separate conducting elements that can be used to form a beam of a particular width and direction for the purpose of ranging over the horizon targets. Each of the elements 402, 404, 406, 408, 410, and 412 can provide six separate channels of signal data that can be used to over-sense a received electromagnetic field (that could include reflections from an illuminated target). Elements 402, 404, and 406 can generate magnetic field readings, while the dipoles 408, 410, and 412 can generate electric field readings. As discussed in detail below, these six channels can be used to generate a Poynting vector that can then be used to estimate the location of an illuminated target.

In one or more examples, elements 402, 404, 406, 408, and 410 can collect electromagnetic energy in different polarizations such as vertical, horizontal, and circular. In the context of surface wave detection, and especially in maritime environments, the waves propagating from a transmitting antenna and reflecting back from a target can be substantially vertically polarized. Thus, since surface waves are the only waves of interest in a maritime OTH radar, the only energy of concern is any energy that is vertically polarized. Thus, in one or more examples, the antenna 400 can be configured to substantially reject electromagnetic energy that is received at the antenna and is either circularly polarized or horizontally polarized. Rejecting both circularly and horizontally polarized signals can help to reduce noise signals collected by the antenna 400 during operation of the antenna.

As discussed above, while using a more compact antenna can be more convenient in terms of space and footprint, and the beam width of such an antenna may be wider when compared to a HF antenna array that is large in size. As an example, the beam width of antenna 400 discussed above can be approximately 160° degrees. Furthermore, a smaller antenna may not have as good gain/efficiency when compared to a larger antenna. Thus in order to get accurate range and location estimates regarding a target, the radar system can include one or more front-end components (described in detail below) that can be used to maximize the SNR of the signal and filter the received signal to eliminate as much noise as possible while also amplifying the signal of interest. The front-end signal processing components can work in conjunction with a data analysis method to yield accurate location information about maritime targets illuminated by a HF surface waver radar.

Figure 5:
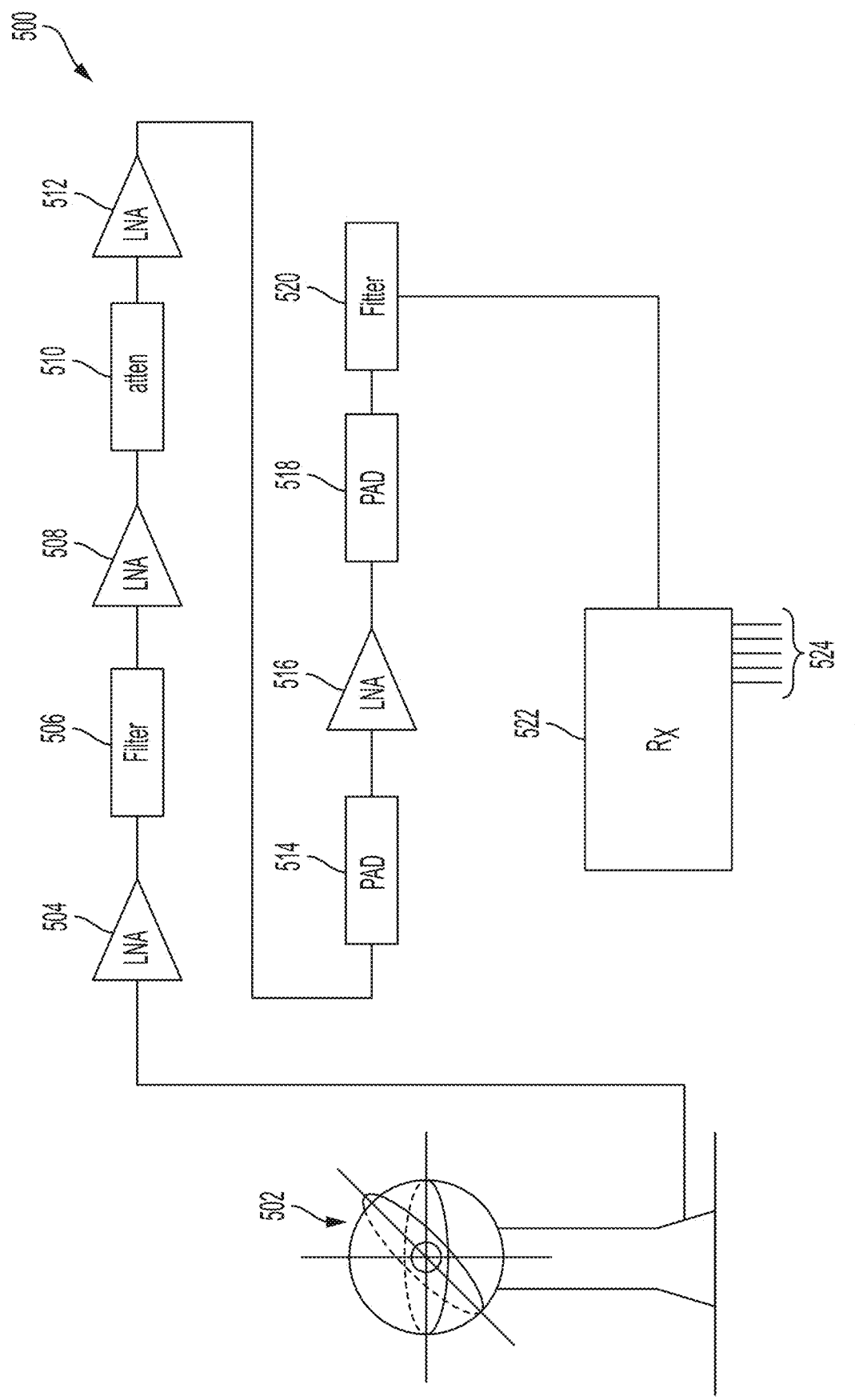
FIG. 5 illustrates an exemplary front-end signal processing system according to examples of the disclosure.

FIG. 5 illustrates an exemplary front-end signal processing system according to examples of the disclosure. In the example of FIG. 5, the system 500 can include an antenna 502 that is configured in the same manner as the antenna 400 discussed above with respect to FIG. 4 and thus a discussion of the configuration of the antenna 502 can be found above in the corresponding discussion of antenna 400. As explained above with respect to FIG. 4, antenna 502 can include six separate receiving elements configured to receiving electromagnetic radiation. The example of FIG. 5 can represent the receive front-end electronics associated with a single channel of the six channels of antenna 502. The complete front-end electronics for the radar system can include a separate set of front-end electronics for each separate channel, wherein each and every set is substantially similar to the system 500 depicted in FIG. 5.

Thus, for a single channel of the six channels outputted by antenna 502, the signal can first be processed by low noise amplifier (LNA) 504 that can amplify the signal to a higher power level so as to help make processing the signal easier to accomplish. Once the signal outputted from antenna 502 has been amplified, the signal can then be put through a narrowband filter 506 that can substantially remove any frequency content that is adjacent to the HF frequency band and can remove any non-linearities that may have been introduced to the signal by the LNA 504.

After filtering the signal using narrowband filter 506, the signal can then be passed through another LNA 508 for further amplification. By employing a first LNA 504, followed by a filter 506, before introducing the signal to the second LNA 508, any non-linearities (such as intermodulation products) caused by the amplification can be substantially reduced. After passing through LNA 508, the signal can pass through a variable attenuator 510. The variable attenuator can act to help balance the individual channels and reduce the power of the signal so as to not saturate the LNAs further in the signal path.

After passing through variable attenuator 510, the signal can pass through LNA 512, a passive attenuator 374 (to keep the LNA from saturating), another LNA 516, and another passive attenuator 518, until finally the signal reaches filter 520. Filter 520 can be configured to pass signals in the HF frequency range, while substantially attenuating signals outside of the HF frequency range. Finally, after passing through filter 520, the signal can be input into a receiver 522.

It should be noted that receiver 520, in one or more examples, can be common to all six of the channels output at antenna 502, and thus the receiver 522 can receive the processed signals from the other five antenna channels as shown at 524. Once the receiver 522 receives signals from each six antenna channels, the receiver can use that data to determine the presence of illuminated targets, and also can use the data to determine the approximate location of the targets. However, since the beam width of the compact antenna can be large (especially as compared to a large HF surface wave radar) pinpointing the location of a target using data collected at a compact antenna can be challenging. In order to use a compact antenna in a HF surface wave radar system, further processing of the six signals received at receiver 522 may be required as described in further detail below.

For instance, in one or more examples, the relationship between the data acquired by the receive antenna and the angle of a target can be exploited to determine target locations. In one more examples, the equation 1 below can represent the relationship between data acquired by a receiving antenna and the signal (i.e., reflection) received from a target.

$$\underbrace{y(l)}_{Data} = \underbrace{c}_{\substack{Cal \\ Vector}} \cdot [\underbrace{A(\theta, \phi)}_{\substack{Steering \\ Matrix}} \underbrace{\beta(\alpha, \gamma)}_{\substack{Polarization \\ Matrix}}] \underbrace{s(l)}_{Signal} + \underbrace{n(l)}_{Noise} \quad \text{Equation 1}$$

In the above equation y(l) can represent the data acquired by the receive antenna as a function of time (l). The constant C can represent the calibration vector (described in further below). $A(\theta,\phi)$ can represent a steering matrix of the antenna. The steering matrix represents the direction/angle at which a particular signal is impinging upon the antenna. In the example of equation 1, the steering matrix A can be a function of θ which can represent the azimuth angle of the signal, and φ which can represent the elevation angle of the signal being detected at the antenna.

$\beta(\alpha,\gamma)$, in one or more examples can represent the polarization matrix of the incoming signal. In other words $\beta(\alpha,\gamma)$ can represent the effects of polarization can have on the aggregate signal y(l) In the example of equation 1, the polarization matrix can be a function of the ellipticity α and the γ of the signal. Also in equation 1, s(l) can represent the signal being received from a target that is oriented with respect to the antenna at an azimuth θ and an elevation of angle φ. As will be discussed in further detail below, s(l) be solved for in the equation above (with assumptions being made about the other variables) to determine if a target exists at a particular azimuth and elevation. Finally in the above equation n(l) can represent the noise. In one or more examples, it can be assumed that the noise is zero mean white Gaussian noise, but other assumptions can be made depending on a priori knowledge of the noise environment.

When the antenna is in operation, the above equation can be used to determine and identify the location of targets that have been illuminated by the radar. During operation of the antenna, the signal y(l), the calibration vector c, the polarization matrix β can all be known. The signal y(l) of course represents the data taken from the system. As discussed above, the only signals of interest can be vertically polarized and thus the other polarizations can be ignored thus allowing for the polarization matrix β to be a known quantity. The calibration vector c can be determined through a calibration procedure that can be performed prior to the operation of the antenna. In one or more examples, the calibration matrix (i.e., vector) can be generated by generating a steering vector to maximize the amplitude of known sources (that are placed at a particular location and range) that are used during the calibration process.

Thus, the only unknowns of equation 1 that are unknown is the steering matrix $A(\theta,\phi)$ and the signal s(l) generated by a target located at a particular azimuth and elevation. In order to determine the location of a target, in one or more examples, a process can be implemented wherein the azimuth and elevation angles of a steering matrix are swept, and the signal s(l) solved for. In one or more examples, if the resultant s(l) is above a pre-determined threshold at a particular value of azimuth and elevation angle, then the process can determine that a target likely exists at that particular location (i.e., at the particular azimuth and elevation angle.)

Figure 6A:
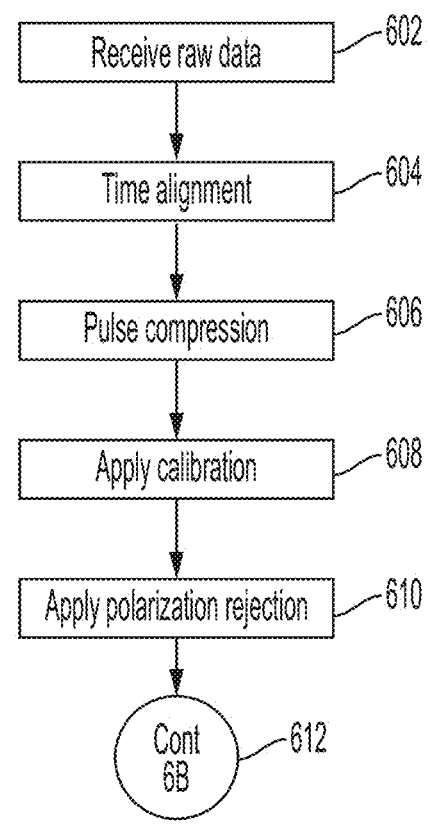
FIGS. 6A-6B illustrate an exemplary process for processing a plurality of data signals received at a vector surface array according to examples of the disclosure.
Figure 6B:
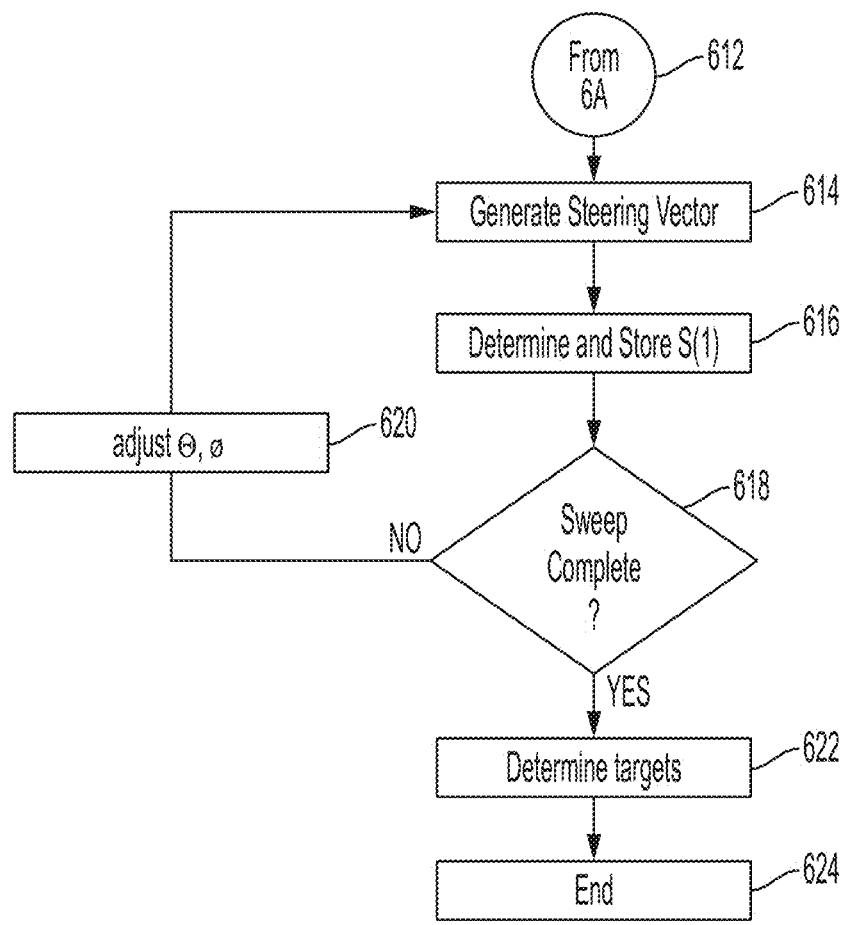

FIGS. 6A-6B illustrate an exemplary process for processing a plurality of data signals received at a vector surface array according to examples of the disclosure. In the example of FIG. 6A, the process 600 can begin at step 602 with the antenna receiving raw data on both the in-phase (I) and quadrature phase (q) channels. Once the data has been received at step 602, the process can move to step 604 wherein the received signal undergoes time alignment so as to synchronize the received signal (in terms of phase) with the receiver electronics described above with respect to FIG. 5. In one or more examples, time alignment step 604 may be unnecessary if the receiver is already synchronized with the transmitter that transmitted the radar wave.

Once the received data has undergone time alignment at step 604, the process can then move to step 606, wherein the received signal can undergo pulse compression using a transmit replica waveform. Pulse compression can refer to a process by which a transmitted pulse is modulated and then the received signal is correlated with the transmitted pulse so as to enhance range resolution and improve the overall signal to noise ratio of the received signal. In the case of step 606, the received signal can be correlated with a transmit replica waveform so as to facilitate pulse compression.

After pulse compression at step 606, the process 600 can move to step 608 wherein the calibration matrix calculated earlier (as discussed above) can be applied to the received signal. At this point in the process 600, and referring to equation 1, the received signal y(l) has been acquired (and process to improve SNR), and the calibration matrix has been applied. The only unknowns are the signals being reflected back by the target and the azimuth/elevation angle of the target.

Thus, once the calibration has been applied at step 608, the process can move to step 610, wherein the any horizontal or circularly polarized signals can be rejected. As discussed above, as surface waves can be transmitted in only the vertical polarization, any signals received by a receive antenna in the horizontal and/or vertical polarizations are likely not of interest and thus can be rejected at step 610. Once the unwanted polarizations have been rejected at step 610, the process 600 can move to step 614 (as depicted in FIG. 6B.) At step 614, the process 600 can make an assumption about the azimuth and elevation angle of a target, and then (in a subsequent step described below) use equation 1 above to solve for s(l) using the assumption about the azimuth and elevation angle. If a true target is reflecting back surface waves to the receiving antenna from a particular azimuth and elevation angle, then when the steering matrix is set to the corresponding azimuth and elevation angle, the signal s(l) will yield a higher value for a given y(l). Thus, in the absence of knowledge of the location of targets, if the steering matrix is swept over a range of azimuth values and a range of elevation angles, the magnitude of s(l) that can be solved for can indicate whether a target exists at that particular azimuth and elevation angle.

In one or more examples, at step 614, using an assumed azimuth and elevation angle, a steering vector can be generated. Once the steering vector has been generated at step 614, the process can move to step 616 wherein the generated steering vector can be used to solve for s(l) using equation 1 described above. Once s(l) at the assumed azimuth and elevation angle is determined, it can be stored in a memory for later processing (as will be described below.)

Once the s(l) corresponding to a particular azimuth and elevation angle has been determined and stored at step 616, the process can move step 618 wherein a determination can be made as to whether the sweep of the azimuth and elevation angles has been completed. In one or more examples, and as discussed above, a vector surface array antenna such as the one discussed above with respect to FIG. 4 can have a beam width associated with it. While the antenna may receive signals from any direction, the steering vector/matrix can impose a limited beam width such that only targets within the beam width are analyzed. Accordingly, the antenna may only be able to capture targets that are within a specific range of azimuth and range of elevation angles. Thus, in order to effectively sweep the steering matrix, each and every combination of azimuth and elevation angles should be considered when trying to solve for s(l) and determine whether any targets are present at the set value for azimuth and elevation.

At step 618, determining whether a sweep of the steering matrix is complete can thus include determine if each possible combination of azimuth and elevation angle has been used to generate a value for s(l). If at step 618 it is determined that the sweep has not been completed, then the process can move to step 620 wherein the azimuth and/or the elevation angle can be adjusted, and the process at step 614 can be repeated using the new azimuth or elevation angle. The process steps 614 and 616 can be repeated for each and every combination of azimuth and elevation angle until an s(l) value has been determined for each and every combination of azimuth and elevation angle.

Once the determination has been made that the sweep is complete at step 618, the process can move to step 622 wherein each value of s(l) determined and stored at step 616 can be used to determine if there is a target at a particular azimuth and elevation angle. In one or more examples, if the amplitude of the s(l) corresponding to a particular azimuth and elevation angle is above a pre-determined threshold then the process 600 at step 622 can determine that there is a target located at that particular azimuth and elevation angle. The amplitude of each s(l) can be compared against the pre-determined threshold, and if the amplitude is found to be greater than the pre-determined value, then the azimuth and elevation angle corresponding to the value of s(l) can be indicated as a location of a likely target.

The process described with respect to FIGS. 6A-6B can allow for a small antenna that thus has a wide beam width to be used for the detection of maritime targets. In contrast to large HF antenna systems that use large footprint antennas to propagate and receive narrow beam width transmissions, the process 600 described above can allow for a smaller antenna with a wide beam width to be used to detect maritime targets using HF surface waves.

Figure 7:
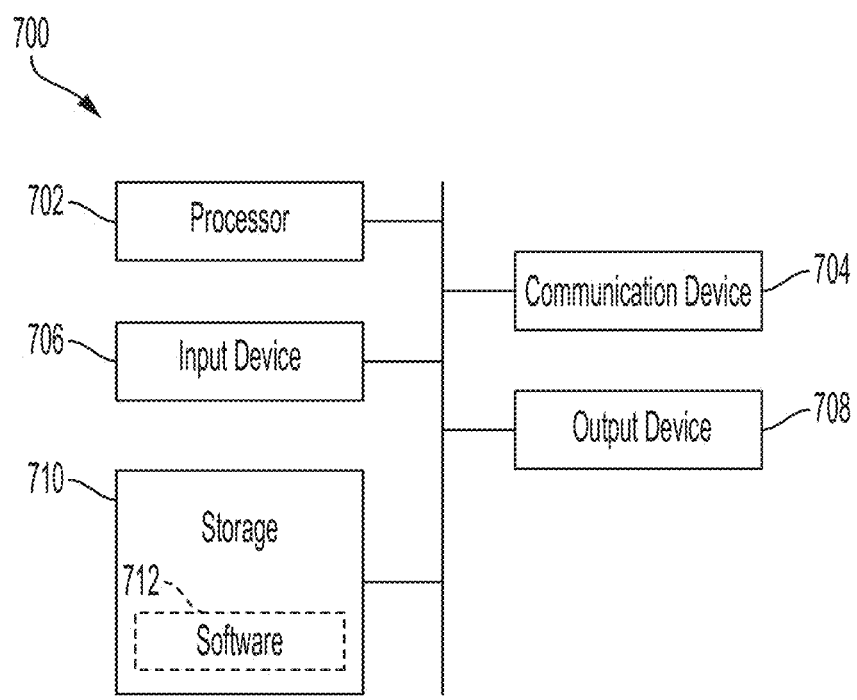
FIG. 7 illustrates an example of a computing device in accordance with one embodiment.

FIG. 7 illustrates an example of a computing device in accordance with one embodiment. Device 700 can be a host computer connected to a network. Device 700 can be a client computer or a server. As shown in FIG. 7, device 700 can be any suitable type of microprocessor-based device, such as a personal computer, workstation, server, or handheld computing device (portable electronic device), such as a phone or tablet. The device can include, for example, one or more of processors 710, input device 706, output device 708, storage 710, and communication device 704. Input device 706 and output device 708 can generally correspond to those described above and can either be connectable or integrated with the computer.

Input device 706 can be any suitable device that provides input, such as a touch screen, keyboard or keypad, mouse, or voice-recognition device. Output device 708 can be any suitable device that provides output, such as a touch screen, haptics device, or speaker.

Storage 710 can be any suitable device that provides storage, such as an electrical, magnetic, or optical memory, including a RAM, cache, hard drive, or removable storage disk. Communication device 704 can include any suitable device capable of transmitting and receiving signals over a network, such as a network interface chip or device. The components of the computer can be connected in any suitable manner, such as via a physical bus or wirelessly.

Software 712, which can be stored in storage 710 and executed by processor 702, can include, for example, the programming that embodies the functionality of the present disclosure (e.g., as embodied in the devices as described above).

Software 712 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 710, that can contain or store programming for use by or in connection with an instruction execution system, apparatus, or device.

Software 712 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 700 can implement any operating system suitable for operating on the network. Software 712 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

According to some examples of the disclosure, a radar system configured to determine a location of a target using received surface waves can include, an antenna, wherein the antenna includes a plurality of components configured to receive one or more surface waves; a receiver, wherein the receiver is configured to receive and process one or more signals received by the plurality of components of the antenna; a memory; and one or more processors, wherein the one or more processors are configured to execute instructions stored on the memory that when executed by the processor cause the device to: set a first azimuth value and a first elevation angle; generate a first steering vector, wherein the first steering vector is generated based on the first azimuth value and the first elevation angle; determine an amplitude of a first target signal based on the generated first steering vector and the one or more signals received at the antenna; compare the determined first target signal with a pre-determined threshold; and if the determined amplitude of the first target signal is found to be greater than the pre-determined threshold, then determine that a first target exists at a first location associated with the first azimuth value and the first elevation angle value. In one or more examples of the disclosure, the processor further causes the device to: set a second azimuth value and a second elevation angle; generate a second steering vector, wherein the second steering vector is generated based on the second azimuth value and the second elevation angle; determine an amplitude of a second target signal based on the generated second steering vector and the one or more signals received at the antenna; compare the determined second target signal with the pre-determined threshold; and if the determined amplitude of the second target signal is found to be greater than the pre-determined threshold, then determine that a second target exists at a second location associated with the second azimuth value and the second elevation angle value. In one or more examples of the disclosure, the plurality of components of the antenna comprises: a plurality of loop antennas arranged orthogonally with respect to one another, and wherein the plurality of loop antennas are configured to generate one or more magnetic field readings; and a plurality of dipole antennas arranged orthogonally with respect to one another, and wherein the plurality of dipole antennas are configured to generate one or more electrical field readings. In one or more examples of the disclosure, each signal processing front-end is coupled to the receiver. In one or more examples, the plurality of loop antennas and the plurality of dipole antennas are configured to receive electromagnetic energy in the high frequency (HF) signal spectrum. In one or more examples, the receiver is configured to reject horizontal and circularly polarized signals received from the plurality of loop antennas and the plurality of dipole antennas. In one or more examples, the processor further causes the device to apply pulse compression to the received one or more surface waves. In one or more examples, determining an amplitude of a first target signal is based on a calibration vector associated with the antenna. In one or more examples, the processor further causes the device to apply a time alignment process to the received one or more surface waves.

According to some examples of the disclosure, a method for determining a location of a target based on surface received on the radar system comprises, setting a first azimuth value and a first elevation angle; generating a first steering vector, wherein the first steering vector is generated based on the first azimuth value and the first elevation angle; determining an amplitude of a first target signal based on the generated first steering vector and one or more signals received at an antenna; comparing the determined first target signal with a pre-determined threshold; and if the determined amplitude of the first target signal is found to be greater than the pre-determined threshold, then determining that a first target exists at a first location associated with the first azimuth value and the first elevation angle value. In one or more examples of the disclosure, the method further comprises: setting a second azimuth value and a second elevation angle; generating a second steering vector, wherein the second steering vector is generated based on the second azimuth value and the second elevation angle; determining an amplitude of a second target signal based on the generated second steering vector and the one or more signals received at the antenna; comparing the determined second target signal with the pre-determined threshold; and if the determined amplitude of the second target signal is found to be greater than the pre-determined threshold, then determine that a second target exists at a second location associated with the second azimuth value and the second elevation angle value. In one or more examples of the disclosure, the plurality of components of the antenna comprises: a plurality of loop antennas arranged orthogonally with respect to one another, and wherein the plurality of loop antennas are configured to generate one or more magnetic field readings; and a plurality of dipole antennas arranged orthogonally with respect to one another, and wherein the plurality of dipole antennas are configured to generate one or more electrical field readings. In one or more examples of the disclosure, each signal processing front-end is coupled to the receiver. In one or more examples, the plurality of loop antennas and the plurality of dipole antennas are configured to receive electromagnetic energy in the high frequency (HF) signal spectrum. In one or more examples, the receiver is configured to reject horizontal and circularly polarized signals received from the plurality of loop antennas and the plurality of dipole antennas. In one or more examples, the processor further causes the device to apply pulse compression to the received one or more surface waves. In one or more examples, determining an amplitude of a first target signal is based on a calibration vector associated with the antenna. In one or more examples, the processor further causes the device to apply a time alignment process to the received one or more surface waves.

According to some examples of the disclosure, a non-transitory computer readable storage medium storing one or more programs, the one or more programs comprising instructions, which when executed by an electronic device with one or more processors and memory, cause the device to, set a first azimuth value and a first elevation angle; generate a first steering vector, wherein the first steering vector is generated based on the first azimuth value and the first elevation angle; determine an amplitude of a first target signal based on the generated first steering vector and one or more signals received at an antenna; compare the determined first target signal with a pre-determined threshold; and if the determined amplitude of the first target signal is found to be greater than the pre-determined threshold, then determining that a first target exists at a first location associated with the first azimuth value and the first elevation angle value. In one or more examples of the disclosure, the device is further caused to: set a second azimuth value and a second elevation angle; generate a second steering vector, wherein the second steering vector is generated based on the second azimuth value and the second elevation angle; determine an amplitude of a second target signal based on the generated second steering vector and the one or more signals received at the antenna; compare the determined second target signal with the pre-determined threshold; and if the determined amplitude of the second target signal is found to be greater than the pre-determined threshold, then determine that a second target exists at a second location associated with the second azimuth value and the second elevation angle value. In one or more examples of the disclosure, the plurality of components of the antenna comprises: a plurality of loop antennas arranged orthogonally with respect to one another, and wherein the plurality of loop antennas are configured to generate one or more magnetic field readings; and a plurality of dipole antennas arranged orthogonally with respect to one another, and wherein the plurality of dipole antennas are configured to generate one or more electrical field readings. In one or more examples of the disclosure, each signal processing front-end is coupled to the receiver. In one or more examples, the plurality of loop antennas and the plurality of dipole antennas are configured to receive electromagnetic energy in the high frequency (HF) signal spectrum. In one or more examples, the receiver is configured to reject horizontal and circularly polarized signals received from the plurality of loop antennas and the plurality of dipole antennas. In one or more examples, the processor further causes the device to apply pulse compression to the received one or more surface waves. In one or more examples, determining an amplitude of a first target signal is based on a calibration vector associated with the antenna. In one or more examples, the processor further causes the device to apply a time alignment process to the received one or more surface waves.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown but is to be accorded the widest scope consistent with the principles and features disclosed herein. Finally, the entire disclosure of the patents and publications referred in this application are hereby incorporated herein by reference.

What is claimed is:

1. A radar system configured to determine a location of a target using received surface waves, the radar system comprising:
    an antenna, wherein the antenna includes a plurality of components configured to receive one or more surface waves;
    a receiver, wherein the receiver is configured to receive and process one or more signals received by the plurality of components of the antenna;
    a memory; and
    one or more processors, wherein the one or more processors are configured to execute instructions stored on the memory that when executed by the one or more processors cause the one or more processors to:
        set a first azimuth value and a first elevation angle;
        generate a first steering vector, wherein the first steering vector is generated based on the first azimuth value and the first elevation angle;
        determine an amplitude of a first target signal based on the generated first steering vector and the one or more signals received at the antenna;
        compare the determined amplitude of the first target signal with a pre-determined threshold; and
        if the determined amplitude of the first target signal is found to be greater than the pre-determined threshold, then determine that a first target exists at a first location associated with the first azimuth value and the first elevation angle value.

2. The radar system of claim 1, wherein the one or more processors are further caused to:
    set a second azimuth value and a second elevation angle;
    generate a second steering vector, wherein the second steering vector is generated based on the second azimuth value and the second elevation angle;
    determine an amplitude of a second target signal based on the generated second steering vector and the one or more signals received at the antenna;
    compare the determined amplitude of the second target signal with the pre-determined threshold; and
    if the determined amplitude of the second target signal is found to be greater than the pre-determined threshold, then determine that a second target exists at a second location associated with the second azimuth value and the second elevation angle value.

3. The radar system of claim 1, wherein the plurality of components of the antenna comprises:
    a plurality of loop antennas arranged orthogonally with respect to one another, and wherein the plurality of loop antennas are configured to generate one or more magnetic field readings; and
    a plurality of dipole antennas arranged orthogonally with respect to one another, and wherein the plurality of dipole antennas are configured to generate one or more electrical field readings.

4. The radar system of claim 3, wherein each loop antenna of the plurality of loop antennas and each dipole antenna of the plurality of dipole antennas is coupled to its own signal processing front-end circuit, wherein each signal processing front-end circuit is configured to amplify and filter signals received on its corresponding loop antenna and dipole antenna.

5. The radar system of claim 4, wherein each signal processing front-end is coupled to the receiver.

6. The radar system of claim 3, wherein the plurality of loop antennas and the plurality of dipole antennas are configured to receive electromagnetic energy in the high frequency (HF) signal spectrum.

7. The radar system of claim 6, wherein the receiver is configured to reject horizontal and circularly polarized signals received from the plurality of loop antennas and the plurality of dipole antennas.

8. The radar system of claim 1, wherein the one or more processors are further caused to apply pulse compression to the received one or more surface waves.

9. The radar system of claim 1, wherein determining the amplitude of the first target signal is based on a calibration vector associated with the antenna.

10. The radar system of claim 1, wherein the one or more processors are further caused to apply a time alignment process to the received one or more surface waves.

11. A method for determining a location of a target based on one or more surface waves received on a radar system, the method comprising:
   setting a first azimuth value and a first elevation angle;
   generating a first steering vector, wherein the first steering vector is generated based on the first azimuth value and the first elevation angle;
   determining an amplitude of a first target signal based on the generated first steering vector and one or more signals received at an antenna;
   comparing the determined amplitude of the first target signal with a pre-determined threshold; and
   if the determined amplitude of the first target signal is found to be greater than the pre-determined threshold, then determining that a first target exists at a first location associated with the first azimuth value and the first elevation angle value.

12. The method of claim 11, wherein the method further comprises:
   setting a second azimuth value and a second elevation angle;
   generating a second steering vector, wherein the second steering vector is generated based on the second azimuth value and the second elevation angle;
   determining an amplitude of a second target signal based on the generated second steering vector and one or more signals received at the antenna;
   comparing the determined amplitude of the second target signal with the pre-determined threshold; and
   if the determined amplitude of the second target signal is found to be greater than the pre-determined threshold, then determining that a second target exists at a second location associated with the second azimuth value and the second elevation angle value.

13. The method of claim 11, wherein the antenna comprises:
   a plurality of loop antennas arranged orthogonally with respect to one another, and wherein the plurality of loop antennas are configured to generate one or more magnetic field readings; and
   a plurality of dipole antennas arranged orthogonally with respect to one another, and wherein the plurality of dipole antennas are configured to generate one or more electrical field readings.

14. The method of claim 13, wherein each loop antenna of the plurality of loop antennas and each dipole antenna of the plurality of dipole antennas is coupled to its own signal processing front-end circuit, wherein each signal processing front-end circuit is configured to amplify and filter signals received on its corresponding loop antenna and dipole antenna.

15. The method of claim 14, wherein each signal processing front-end is coupled to a receiver configured to receive and process one or more signals received by the antenna.

16. The method of claim 13, wherein the plurality of loop antennas and the plurality of dipole antennas are configured to receive electromagnetic energy in the high frequency (HF) signal spectrum.

17. The method of claim 16, wherein a receiver of the radar system is configured to reject horizontal and circularly polarized signals received from the plurality of loop antennas and the plurality of dipole antennas.

18. The method of claim 11, wherein the method further comprises applying pulse compression to the received one or more surface waves.

19. The method of claim 11, wherein determining the amplitude of the first target signal is based on a calibration vector associated with the antenna.

20. The method of claim 11, wherein the method comprises applying a time alignment process to the received one or more surface waves.

21. A non-transitory computer readable storage medium storing one or more programs for determining a location of a target based on one or more surface waves, the one or more programs comprising instructions, which when executed by an electronic device, cause the electronic device to:
   set a first azimuth value and a first elevation angle;
   generate a first steering vector, wherein the first steering vector is generated based on the first azimuth value and the first elevation angle;
   determine an amplitude of a first target signal based on the generated first steering vector and one or more signals received at an antenna;
   compare the determined amplitude of the first target signal with a pre-determined threshold; and
   if the determined amplitude of the first target signal is found to be greater than the pre-determined threshold, then determine that a first target exists at a first location associated with the first azimuth value and the first elevation angle value.

22. The non-transitory computer readable storage medium of claim 21, wherein the electronic device is further caused to:
   set a second azimuth value and a second elevation angle;
   generate a second steering vector, wherein the second steering vector is generated based on the second azimuth value and the second elevation angle;
   determine an amplitude of a second target signal based on the generated second steering vector and one or more signals received at the antenna;
   compare the determined amplitude of the second target signal with the pre-determined threshold; and
   if the determined amplitude of the second target signal is found to be greater than the pre-determined threshold, then determine that a second target exists at a second location associated with the second azimuth value and the second elevation angle value.

23. The non-transitory computer readable storage medium claim 21, wherein the antenna comprises:
   a plurality of loop antennas arranged orthogonally with respect to one another, and wherein the plurality of loop antennas are configured to generate one or more magnetic field readings; and
   a plurality of dipole antennas arranged orthogonally with respect to one another, and wherein the plurality of dipole antennas are configured to generate one or more electrical field readings.

24. The non-transitory computer readable storage medium of claim 23, wherein each loop antenna of the plurality of loop antennas and each dipole antenna of the plurality of dipole antennas is coupled to its own signal processing front-end circuit, wherein each signal processing front-end circuit is configured to amplify and filter signals received on its corresponding loop antenna and dipole antenna.

25. The non-transitory computer readable storage medium of claim 24, wherein each signal processing front-end is coupled to a receiver.

26. The non-transitory computer readable storage medium of claim 23, wherein the plurality of loop antennas and the plurality of dipole antennas are configured to receive electromagnetic energy in the high frequency (HF) signal spectrum.

27. The non-transitory computer readable storage medium of claim 26, wherein the electronic device includes a receiver configured to reject horizontal and circularly polarized signals received from the plurality of loop antennas and the plurality of dipole antennas.

28. The non-transitory computer readable storage medium of claim 21, wherein the electronic device is caused to apply pulse compression to the received one or more surface waves.

29. The non-transitory computer readable storage medium of claim 21, wherein determining the amplitude of the first target signal is based on a calibration vector associated with the antenna.

30. The non-transitory computer readable storage medium of claim 21, wherein the electronic device is caused to apply a time alignment process to the received one or more surface waves.

* * * * *